United States Patent [19]
Tsubouchi et al.

[11] Patent Number: 6,018,641
[45] Date of Patent: Jan. 25, 2000

[54] RADIO IC CARD SYSTEM

[75] Inventors: Kazuo Tsubouchi, 1-7 Yukigaya, Otsuka-Cho, Ota-ku, Tokyo; Jun Hozumi; Toshiyuki Azuma, both of Miyagi-ken, all of Japan

[73] Assignee: Kazuo Tsubouchi, Japan

[21] Appl. No.: 08/838,773

[22] Filed: Apr. 10, 1997

[30] Foreign Application Priority Data

Apr. 15, 1996 [JP] Japan .................................. 8-092881

[51] Int. Cl.$^7$ ...................................................... H04B 7/00
[52] U.S. Cl. ........................... 455/38.2; 235/382; 455/78; 340/825.31
[58] Field of Search ............................. 340/286.07, 571, 340/825.31; 343/700, 789, 41, 156; 455/38.2, 226.4, 558, 78; 364/468, 467; 705/12, 13; 235/490, 492, 382, 384; 342/51, 42; 380/22, 23, 24; 375/200, 368, 367

[56] References Cited

U.S. PATENT DOCUMENTS

| | | | |
|---|---|---|---|
| 4,048,563 | 9/1977 | Osborne | 375/367 |
| 4,303,904 | 12/1981 | Chasek | 235/384 |
| 5,008,898 | 4/1991 | Hamatsu et al. | 375/200 |
| 5,086,389 | 2/1992 | Hassett et al. | 705/13 |
| 5,225,667 | 7/1993 | Furuta et al. | 235/492 |
| 5,424,727 | 6/1995 | Shieh | 340/928 |
| 5,432,815 | 7/1995 | Kang et al. | 375/200 |
| 5,448,110 | 9/1995 | Tuttle et al. | 524/100 |
| 5,465,405 | 11/1995 | Baseghi et al. | 455/226.4 |
| 5,471,203 | 11/1995 | Sasaki et al. | 340/825.31 |
| 5,525,991 | 6/1996 | Nagura et al. | 395/500.1 |
| 5,530,702 | 6/1996 | Palmer et al. | 370/445 |
| 5,541,985 | 7/1996 | Ishii et al. | 379/111 |
| 5,602,919 | 2/1997 | Hurta et al. | 380/24 |
| 5,682,603 | 10/1997 | Sano | 455/38.2 |
| 5,777,565 | 7/1998 | Hayashi et al. | 340/928 |
| 5,787,174 | 7/1998 | Tuttle | 380/23 |
| 5,805,082 | 9/1998 | Hassett | 340/928 |
| 5,866,891 | 2/1999 | Fujimoto et al. | 235/435 |
| 5,929,414 | 7/1999 | Saitoh | 235/380 |

OTHER PUBLICATIONS

"A Card–size SS Demodulator Using a 2.4GHz Front–end SAW Correlator", *The Institute of Electronics Information and Communication Engineers*, Y. Maruta, et al., pp. 13–18 (with an English translation).

*Primary Examiner*—Reinhard J. Eisenzopf
*Assistant Examiner*—Charles N. Appiah
*Attorney, Agent, or Firm*—Brinks Hofer Gilson & Lione

[57] ABSTRACT

A radio IC card system includes an IC card and a toll collector. When an automobile with the IC card passes by a tollgate, the toll collector installed in the tollgate transmits a first radio signal which is spread modulated using a pseudorandom noise (PN) code from an antenna. The first radio signal is received by the antenna of the IC card and is transmitted to a surface acoustic wave (SAW) correlator. The SAW correlator extracts a PN code included in the received signal, and outputs a peak signal. An accumulation circuit accumulates the peak signal. A threshold discharger is activated to switch on a relay switch when the output voltage of the accumulation circuit exceeds a constant value. Thereby, the voltage of a battery is supplied to a data communication unit. Then, the identification code of the IC card and a record of tollgates by which the automobile has passed are transmitted via radio signal to the toll collector.

4 Claims, 9 Drawing Sheets

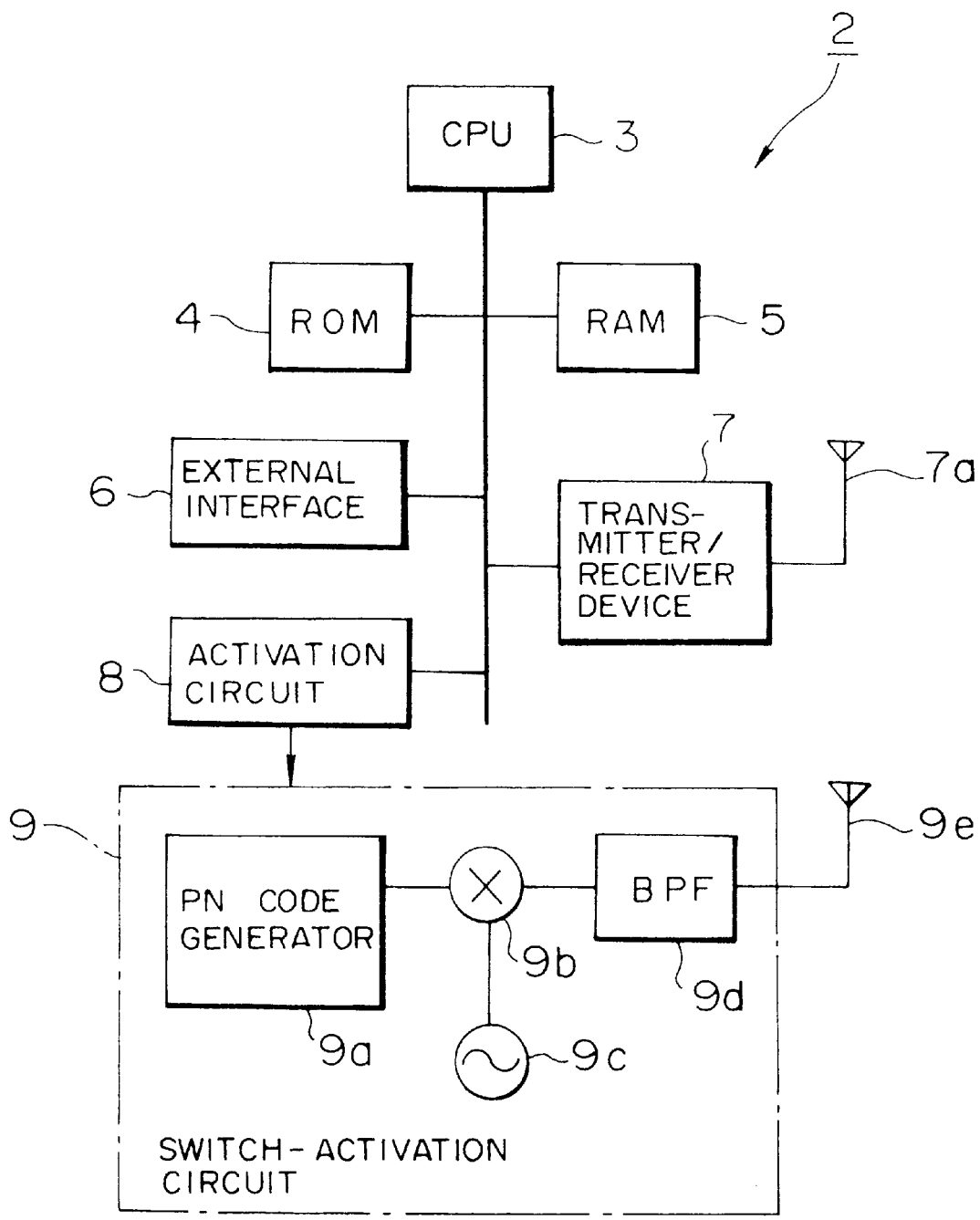

FIG. 4A PN CODE
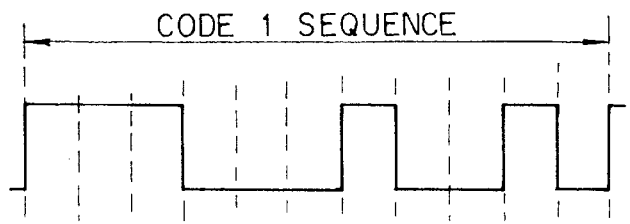
FIG. 4B CARRIER
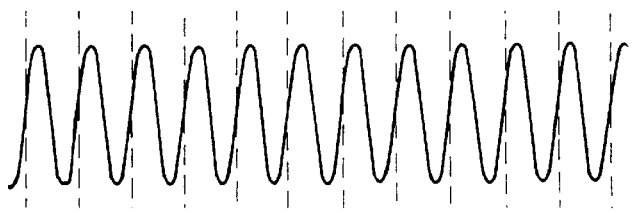
FIG. 4C SPREAD SIGNAL
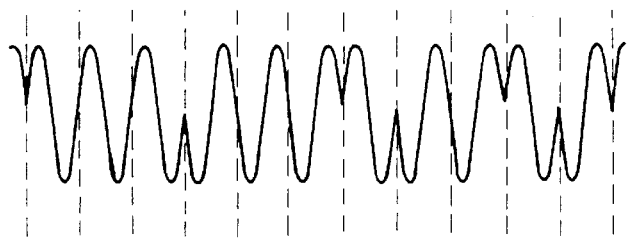
FIG. 5
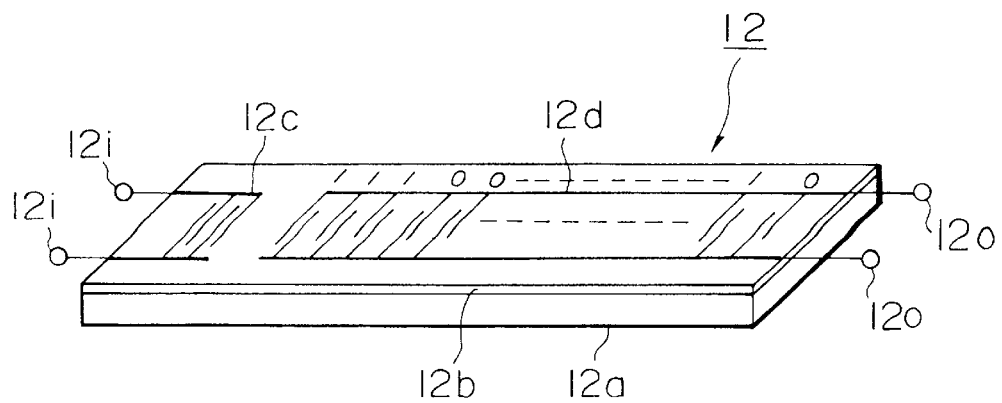

FIG. 6
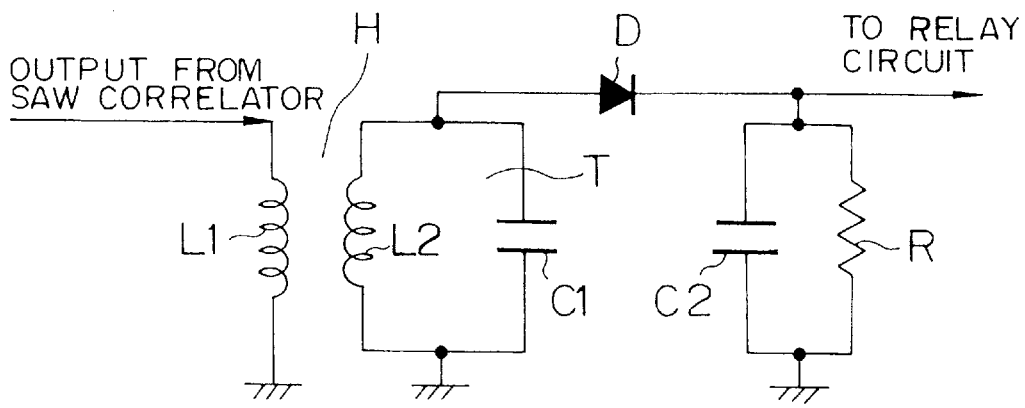
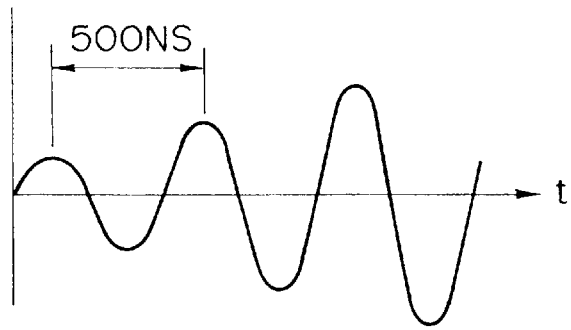
FIG. 7A
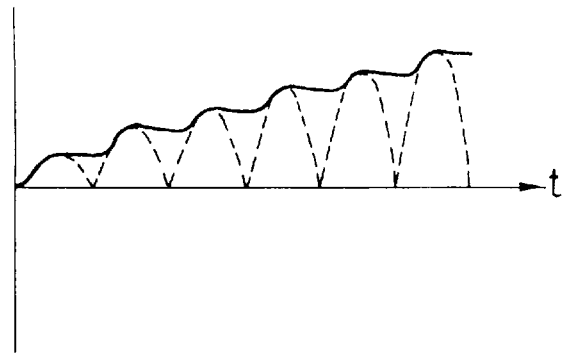
FIG. 7B

RADIO IC CARD SYSTEM

BACKGROUND OF THE INVENTION

1. Field of the Invention

This invention relates to radio integrated circuit (IC) card systems in which power consumption is reduced.

2. Description of the Related Art

Nowadays, research on various types of systems utilizing IC cards is in progress.

It is anticipated that IC cards will be applied to various fields because they include both a mass storage unit and a central processing unit (CPU) for processing data stored in the storage unit, thereby differing from magnetic cards.

At present, IC card systems are classified into a contact IC card system and a radio IC card system (non-contact IC card system).

FIG. 11A shows a block diagram of a contact IC card system.

According to this contact IC card system, transmission or reception of data is performed between an IC card system 100 and a reader/writer unit 101 via connectors 102 and 103.

Since the IC card system 100 and the reader/writer unit 101 are connected by the connectors 102 and 103, a CPU 104 in the IC card 100 can be supplied with power through the connectors 102 and 103.

FIG. 11B shows a block diagram of a conventional radio IC card system.

According to this radio IC card system, transmission or reception of data is performed by radio between an IC card 200 and a reader/writer unit 201 via a transmitter/receiver unit 202. Since this system is radio-operated, the IC card 200 cannot be supplied with power from the reader/writer unit 201. Consequently, the IC card 200 needs a built-in battery 204 to supply power to the transmitter/receiver unit 202 and the CPU 205.

Although the radio IC card system has a more complicated structure than the contact IC card system, transmission or reception of data can be performed over a distance between the IC card 200 and the reader/writer unit 201. Thus, the radio IC card system can be applied to a wide range of fields such as transportation, distribution, and factory automation. For example, by using radio IC cards disposed in automobiles and reader/writer units disposed in tollgates, the identification code of each automobile and the tollgate by which the automobile has passed can be recorded without stopping the automobile at the tollgate because transmission or reception of data can be performed between the IC card and the reader/writer unit. Afterward, the toll is collected online from the bank account specified by the identification code.

A problem associated with the above-described radio IC card system is power consumption while the transmitter/receiver unit is in standby mode.

In other words, to activate the transmitter/receiver unit 202 in the IC card 200 by radio, the transmitter/receiver unit 202 needs to always be in a condition capable of receiving radio waves. For this purpose, the active state of the transmitter/receiver unit 202 must always be maintained.

However, maintaining the active state of the transmitter/receiver unit 202 as always active increases power consumption of the unit 202, and as shown in FIG. 11B, activation of the transmitter/receiver unit 202 by the battery 204 severely shortens the life of the battery 204 due to power consumption by the transmitter/receiver unit 202.

One possible solution to the above problem is to provide a switch between the transmitter/receiver unit 202 and the battery 204 so that the switch is activated only when the IC card is used.

However, the IC card is thin by nature, and is weak against externally applied force, thus, it is not preferable to use a switch-like mechanical member mounted to the IC card, because this would make the IC card less durable.

In addition, compared with the contact IC card system, the radio IC card system has an advantage in that the IC card functions without connection to the connector of the reader/writer unit, in other words, it is automatically operated without being touched by the user, but merely by being possessed by the user. This advantage is lost in the IC card if the power switch must be manually turned on for each use.

SUMMARY OF THE INVENTION

Accordingly, it is an object of the present invention to provide an IC card which is automatically activated to transmit or receive data upon receiving a radio signal, in which power consumption in standby mode can be reduced to zero or the vicinity thereof, and a radio IC card system utilizing such an IC card.

According to a first aspect of the present invention, the foregoing object is achieved through the provision of an IC card including radio switching means which are activated in response to a first radio signal having a predetermined particular pattern, and a data communication unit for transmitting data to and receiving data from a radio data transmitter/receiver device having transmitted the data having the particular pattern when being supplied with power in accordance with the activation of the radio switching means, while processing the data, and breaking the power supply after terminating transmission or reception and processing of the data.

Preferably, the radio switching means includes a receiving antenna, a surface acoustic wave device to which a first radio signal received by the receiving antenna is applied for extracting a particular pattern included in the first radio signal, an accumulation circuit for accumulating output power from the surface acoustic wave device, and a switching circuit which is activated when the output power from the accumulating circuit exceeds a constant value.

In accordance with the present invention, the surface acoustic wave device may comprise a surface acoustic wave (SAW) matched filter.

Also in accordance with the present invention, the SAW matched filter includes an $Al_2O_3$ substrate, an AlN film formed on the $Al_2O_3$ substrate, and an Al tapping pattern formed on the AlN film.

According to a second aspect of the present invention, the foregoing object is achieved through the provision of a radio data transmitter/receiver device including switch-activation means for transmitting first radio signal having a predetermined particular pattern, and transmitter/receiver means for transmitting a second radio signal including predetermined data to and for receiving a third radio signal including data from a data communication unit activated by the first radio signal having the particular pattern.

Preferably, the switch-activation means includes noise code generating means for generating a pseudorandom noise code, modulation means for generating a first radio signal by modulating a carrier using the noise code, and an antenna for radiating the first radio signal modulated by the modulation means in the air.

According to a third aspect of the present invention, the foregoing object of the present invention is achieved through the provision of a radio IC card system including an IC card and a radio data transmitter/receiver device. The IC card includes radio switching means which are activated in response to a first radio signal having a predetermined particular pattern, and a data communication unit for transmitting a third radio signal including data to and receiving a second radio signal including data from a radio data transmitter/receiver device having transmitted the first radio signal having the particular pattern when being supplied with power in accordance with the activation of the radio switching means, while processing the data, and breaking the power supply after terminating transmission or reception and processing of the data. The radio data transmitter/receiver device includes switch-activation means for transmitting first radio signal having the predetermined particular pattern, and transmitter/receiver means for transmitting the second radio signal to and for receiving the third radio signal from a data communication unit activated by the data having the particular pattern.

The above-described present invention provides a radio IC card system in which high reliability is attained and power consumption while the system is standing by can reduced to approximately zero.

BRIEF DESCRIPTION OF THE DRAWINGS

FIG. 3 is a block diagram showing a toll collector according to the embodiment.

FIGS. 4A to 4C are waveform charts showing signals in portions of a switch-activation circuit shown in FIG. 3.

FIG. 5 is a perspective view illustrating an example of an SAW correlator shown in FIG. 2.

FIG. 6 is a circuit diagram showing an accumulation circuit shown in FIG. 2.

FIGS. 7A and 7B are waveform charts showing the operation of the circuit shown in FIG. 6.

DESCRIPTION OF THE PREFERRED EMBODIMENT

By referring to the attached drawings, an embodiment of a radio IC card system in accordance with the present invention will described below.

Figure 1:
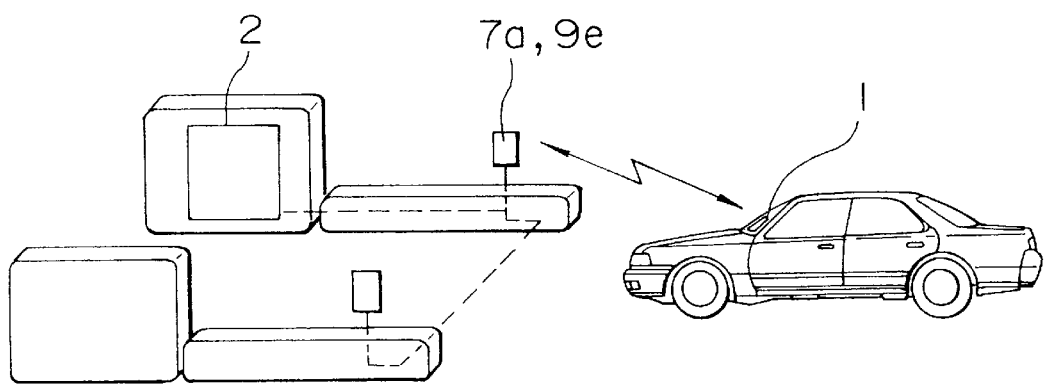
FIG. 1 is a schematic view illustrating a radio IC card according to an embodiment of the present invention.

FIG. 1 shows a schematic view illustrating a radio IC card system according to one embodiment of the present invention. An IC card 1 is disposed inside the front windowshield of an automobile. Whenever the automobile is driven on a toll road, the code of tollgate at which the automobile enters the toll road and the code of a tollgate at which the automobile exits the toll road are stored as a record in the IC card 1.

A toll collector 2 is installed at the tollgate, which remotely activates the IC card 1 to transmit data to or to receive data from the IC card 1.

Figure 2:
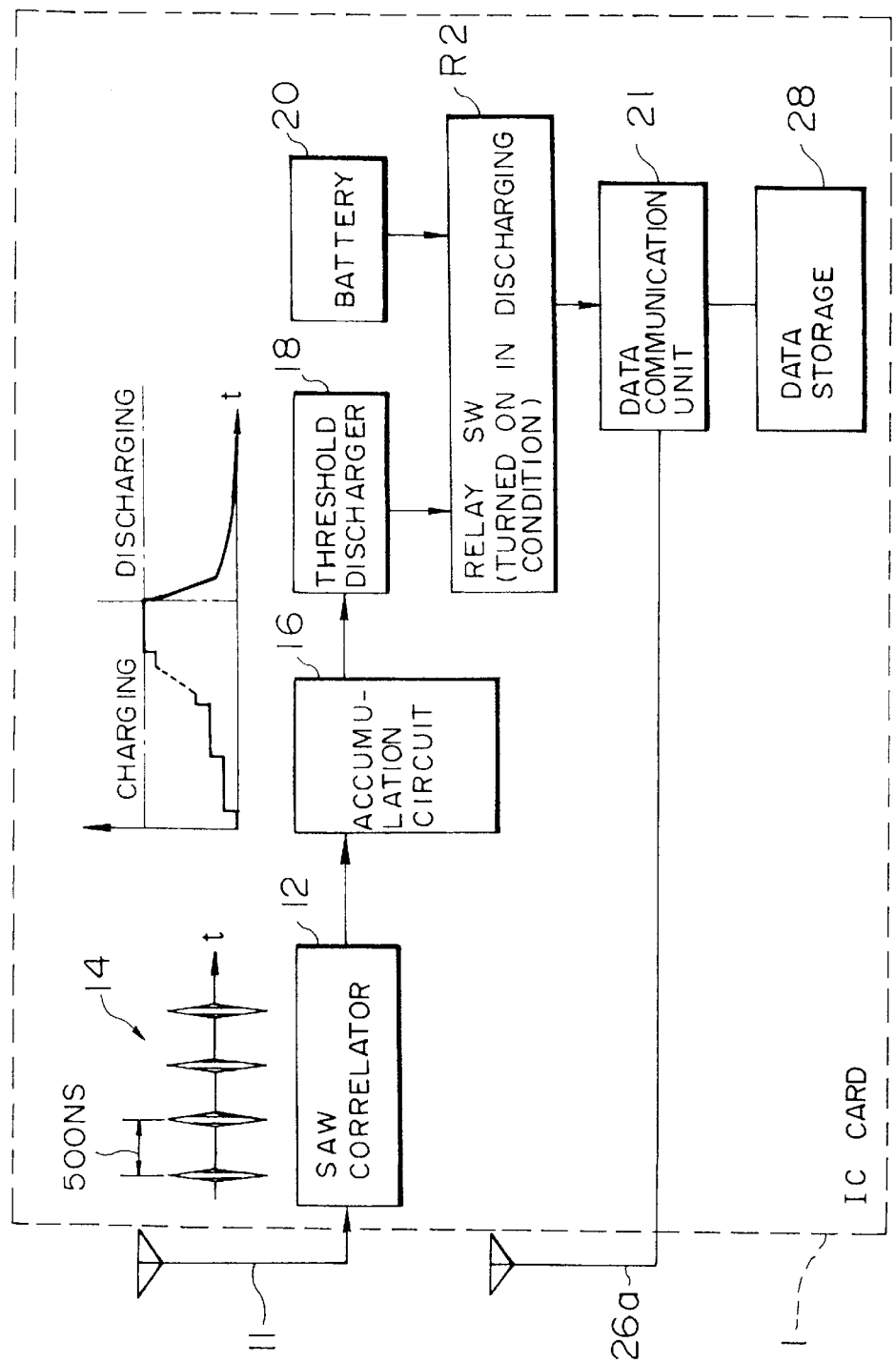
FIG. 2 is a block diagram showing the radio IC card according to the embodiment.

The structures and operations of the IC card 1 and the toll collector 2 are as follows:

FIG. 2 shows a block diagram of the IC card 1. FIG. 3 shows a block diagram of the toll collector 2.

As shown in FIG. 3, the toll collector (radio data transmitter/receiver device) 2 includes a central processing unit (CPU) 3, a read-only memory (ROM) 4 for storing programs used in the CPU 3, a random access memory (RAM) 5 for temporary storage of data, an external interface 6 for connecting the toll collector 2 to various types of terminals (not shown), a transmitter/receiver device 7 for transmitting data via radio signals to the IC card 1 (shown in FIG. 2) and for receiving data via radio signals from the IC card 1, and an activation circuit 8 for activating a switch-activation circuit 9 by turning on its power supply switch in accordance with an activation instruction from the CPU 3.

The switch-activation circuit 9 activates the IC card 1 by transmitting a (first) radio signal using spread spectrum communication.

The switch-activation circuit 9 includes a pseudorandom noise (PN) code generator 9a. A PN code is a cyclic, pseudorandom noise code. Known PN codes are a Maximum in length sequence, a Barker sequence, a Gold sequence, and so forth. The PN code generator 9a repeatedly generates and outputs a PN code shown in FIG. 4A to a modulation circuit 9b during a predetermined period. The PN code shown in FIG. 4A is a 11-bit Barker code, and one cycle of the code is expressed as follows:

11100010010

An oscillation circuit 9c shown in FIG. 3 generates a carrier. The waveform of the carrier is shown in FIG. 4B. The modulation circuit 9b outputs a spread modulated carrier which includes the PN code (predetermined pattern). The output waveform of the modulation circuit 9b is shown in FIG. 4C. The output of the modulation circuit 9b is radiated from an antenna 9e through a band-pass filter 9d.

The IC card 1 shown in FIG. 2 includes an antenna 11 and a surface acoustic wave (SAW) correlator (SAW matched filter) 12. As shown in FIG. 5 (perspective view), the SAW correlator 12 includes a substrate 12a comprised of $Al_2O_3$ (sapphire), and an AlN (aluminum nitride) film 12b formed on the $Al_2O_3$ substrate 12a by an MO-CVD method. An aluminum (Al) input pattern 12c and an Al tapping pattern 12d are formed on the AlN film 12b by an opto-lithography technique. The Al tapping pattern 12d corresponds to the above-mentioned Barker code (11100010010).

When a spread (first radio) signal shown in FIG. 4C is received by the antenna 11, and is applied to the input pattern 12c of the SAW correlator 12, the applied signal becomes a surface acoustic wave, which is conducted by the surface of the SAW correlator 12 through the tapping pattern 12d. When the phase (predetermined pattern) of the conducted wave motion coincides with the tapping pattern 12d, the amplitude of each wave is integrated, and a correlated peak eleven times the amplitude appears at output ends 12o of the tapping pattern 12d. In other words, as shown in FIG. 2, correlated peaks 14 appear with respect to eleven cycles of the carrier at the output ends of the SAW correlator 12. When the phase of the wave motion does not coincide with the tapping pattern 12d, voltage across the output ends 12o is not more than $\frac{1}{11}$ of the correlated peak. The output of the SAW correlator 12 is inputted to an accumulation circuit 16.

The AlN-on-Al$_2$O$_3$ structure shown in FIG. 5 has a propagation velocity of approximately 6000 m/second, which is 1.5 to 2 times higher than that of other piezoelectric bodies. This enables a large sized structure to be processed. In addition, the structure has a relatively large electromechanical coupling coefficient of approximately 1%. This causes a propagation period temperature coefficient of zero, so the structure is suitable for a gigahertz-band surface acoustic wave material.

As shown in FIG. 6, the accumulation circuit 16 includes a high frequency coil H comprised of a primary coil L1 and a secondary coil L2, a tank circuit T comprised of the secondary coil L2 and a capacitor C1 which are connected in parallel, a diode D for rectifying the output of the tank circuit T, a capacitor C2 for accumulating the output of the diode D, and a resistor R connected in parallel to the capacitor C2.

The resonance frequency of the tank circuit T coincides with the frequency (2 MHz) of the correlated peak waveform outputted from the SAW correlator 12. As a result, the tank circuit T accepts only components of the correlated peaks, and sequentially accumulates the components. In FIG. 7A, the voltage between both ends of the capacitor C1 is shown. The output voltage of the tank circuit T charges the capacitor C2 via the diode D. As a result, as shown in FIG. 7B, the voltage between both ends of the capacitor C2 successively increases. The voltage of the capacitor C2 is applied to a threshold discharger 18.

Figure 8:
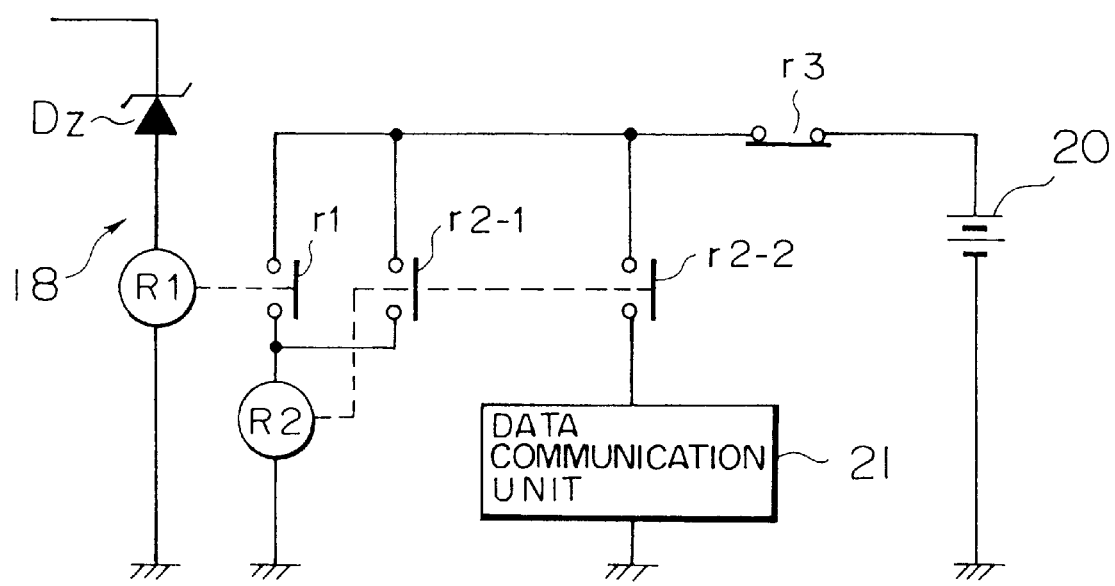
FIG. 8 is a circuit diagram showing a threshold discharger and a relay switch shown in FIG. 2.

A configuration of the threshold discharger 18 and the relay switch R2 is shown in FIG. 8. The threshold discharger 18 includes a Zener diode Dz and a relay switch R1 connected in series to the Zener diode Dz. The relay switch R1 has small power consumption (for example, 50 mW). When the output voltage of the accumulation circuit 16 exceeds the Zener voltage of the Zener diode Dz, the Zener diode Dz is switched on to activate the relay switch R1, and a contact r1 is closed. Thereby, the voltage of the battery 20 is supplied to the relay switch R2 to be activated. Then, contacts r2-1 and r2-2 are closed. When the contact r2-1 is closed, the relay switch R2 is self-held. When the contact r2-2 is closed, the voltage of the battery 20 is supplied to a data transmitting unit 21 to operate.

Figure 9:
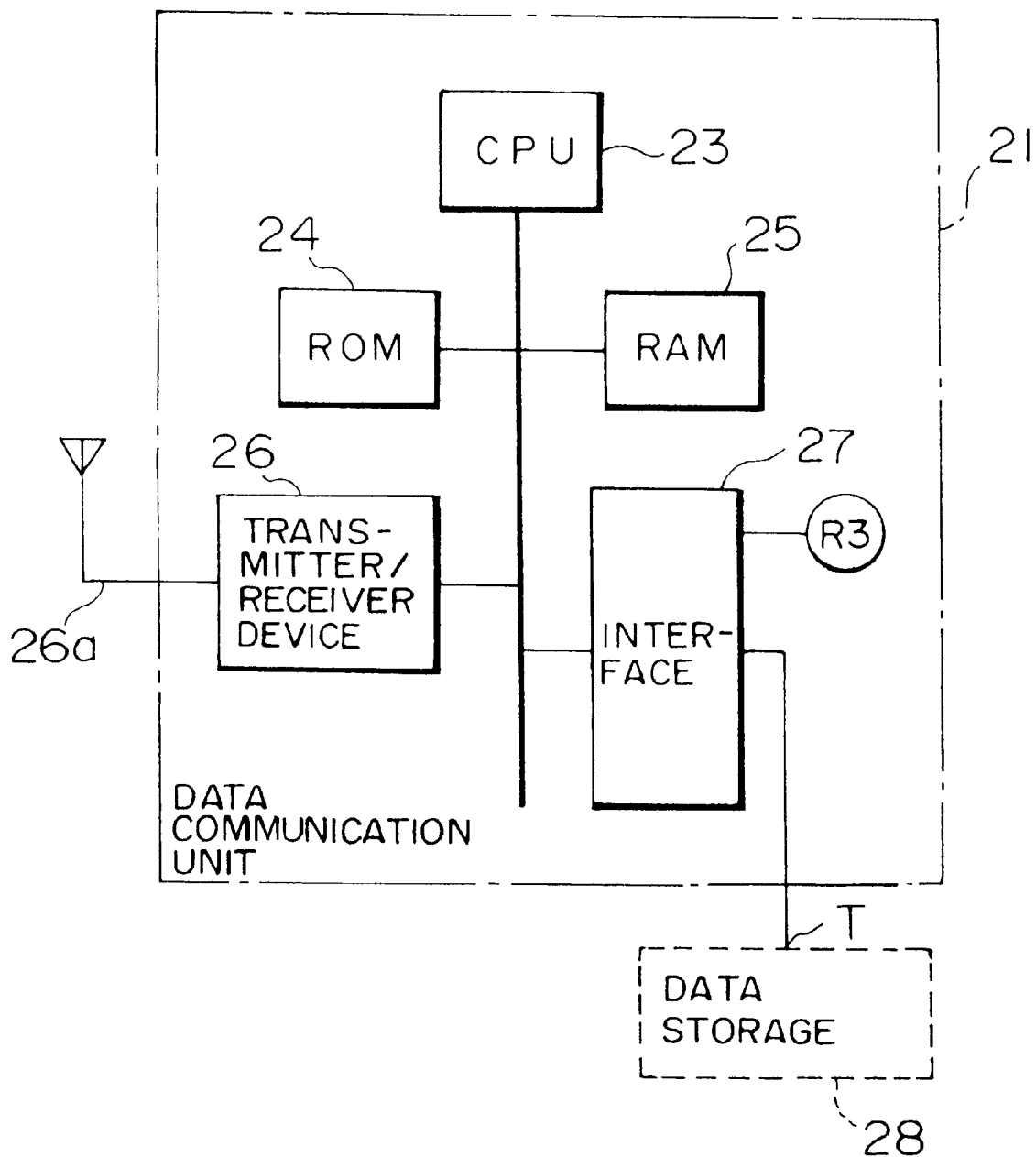
FIG. 9 is a block diagram showing a data communication unit shown in FIG. 2.

FIG. 9 shows a block diagram of a data communication unit 21. The data communication unit 21 includes a CPU 23, a ROM 24 for storing the identification code and programs of the IC card, a RAM 25, a transmitter/receiver device 26, an interface circuit 27, and a relay switch R3 which has a normally closed contact r3 (shown in FIG. 8) inserted in the circuit of the battery 20. A data storage 28, comprising a non-volatile memory (E$^2$PROM, flash memory, and so forth), stores a record of tollgates through which the automobile has passed. Storage contents of the data storage 28 can be read or written as digital data from an output terminal T.

In the above arrangement, when the contact r2-2 shown in FIG. 8 is closed, the output voltage of the battery 20 is supplied as power supply voltage to the data communication unit 21, so portions of the unit 21 are activated. Then, radio communication is performed between the IC card 1 and the toll collector 2.

In other words, when the automobile with the IC card according to the present invention enters the toll road, with the power supplied to the data communication unit 21 in the above-mentioned operation, the transmitter/receiver device 26 receives a tollgate code which is transmitted in a (second) radio signal by the toll collector 2. The CPU 23 reads the received tollgate code, and writes it into the data storage 28 via the interface 27. With this operation, the tollgate code which represents the tollgate at which the automobile entered the toll road is stored as a record into the data storage 28.

In addition, when the automobile with the IC card 1 according to the present invention exits the toll road, with the power supplied to the data communication unit 21, the CPU 23 reads the identification code of the IC card 1 from the ROM 24, and sends the read identification code to the transmitter/receiver device 26. Also, the CPU 23 reads the record stored by the data storage 28 (namely, the tollgate code representing the start point at which the automobile entered the toll road) from the data storage 28 via the interface 27, and sends the read tollgate code to the transmitter/receiver device 26.

The transmitter/receiver device 26 modulates a carrier with the identification code and the tollgate code to transmit the modulated carrier as a (third) radio signal the antenna 26a in the air. The transmitted signal is received by the transmitter/receiver device 7 shown in FIG. 3 to be demodulated to the original codes.

Based on the received tollgate code (the toll gate code representing the start point at which the automobile entered the toll road), the CPU 3 in the toll collector 2 calculates the toll. The CPU 3 transmits the received identification code (the identification code of the IC card 1) and the calculated toll online to various types of terminals (not shown) via the external interface 6. The terminals perform a toll adjustment process based on the received identification code and a predefined toll rate.

The CPU 23 shown in FIG. 9 activates the relay switch R3 by transmitting a control signal via the interface 27 when the transmitter/receiver device 26 has terminated data transmission and reception. The activation of the relay switch R3 closes the contact r3 (as shown in FIG. 8), and switches off the coil power supply of the relay switch R2. Then, the contact r2-2 is opened to switch off the power supply of the data communication unit 21.

Details of one embodiment of the present invention have been described. According to this embodiment, the toll of the toll road can be remotely paid from the automobile without stopping the automobile and physically connecting the IC card 1 to the toll collector 2. In addition, according to this embodiment, until the phase of the (first) radio signal received by the antenna 11 (shown in FIG. 2) completely coincides with the tapping pattern of the SAW correlator 12, the data communication unit 21 is not activated. Thus, the data communication unit 21 rarely malfunctions, so high reliability is advantageously obtained. Moreover, until the relay switch R1 is activated, the circuit of the battery 20 is mechanically, completely isolated by the contacts r1, r2-1 and r2-2. Thus, leakage current is theoretically zero, which reduces the power consumption of the battery 20 while the IC card is in standby mode.

The present invention is not limited to this embodiment but includes modifications within the spirit and scope thereof.

Figure 10:
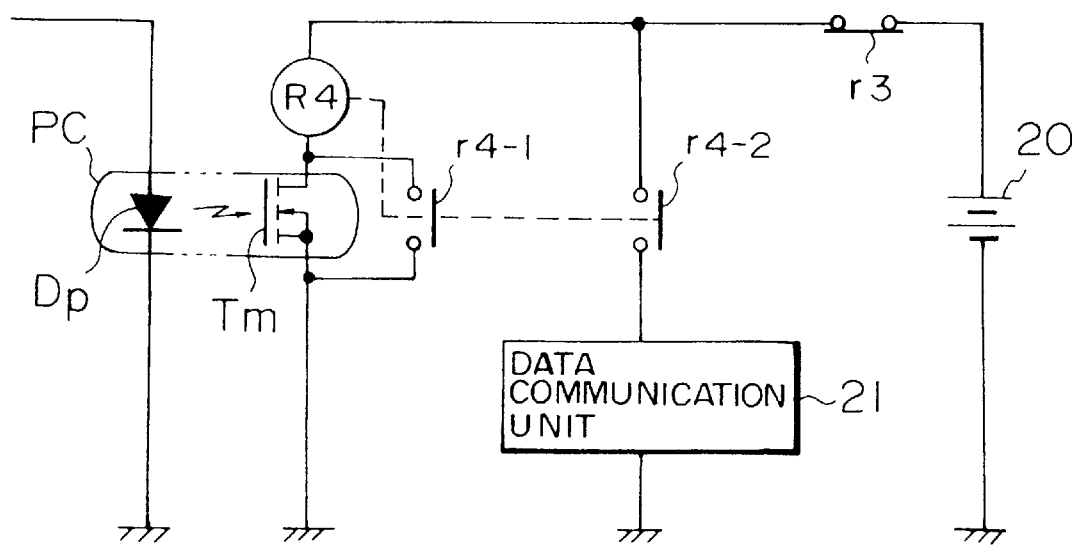
FIG. 10 is a circuit diagram showing a modification of the circuit shown in FIG. 8.
Figure 11A:
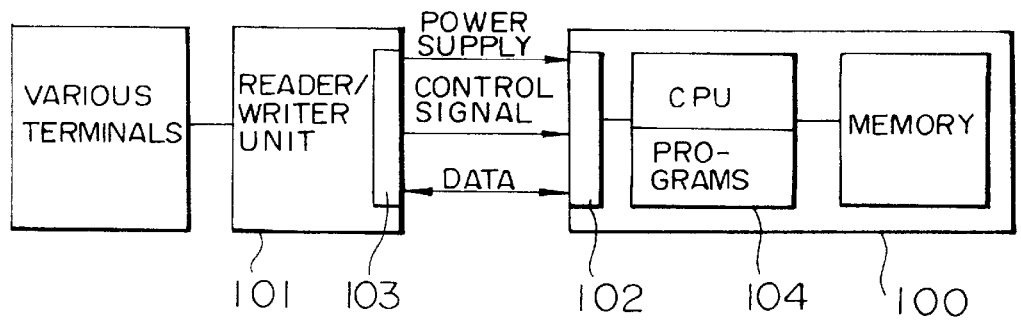
FIGS. 11A and 11B are block diagrams showing a contact IC card system and a conventional radio IC card system, respectively.
Figure 11B:
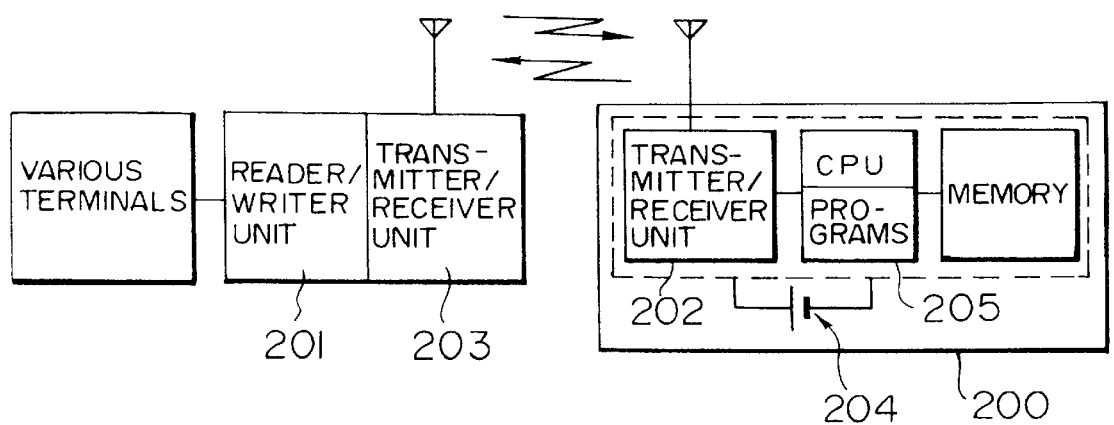

For example, to improve sensitivity, the circuit shown in FIG. 10 may be used in place of the circuit shown in FIG. 8. The circuit in FIG. 10 includes a photocoupler PC comprised of a light-emitting diode Dp and a MOS phototransistor Tm, instead of the Zener diode Dz and the relay switch R1 both shown in FIG. 8. According to the circuit in FIG. 10, when an output voltage from the accumulation circuit 16 reaches the forward voltage of the light-emitting coupler Dp or higher, the light-emitting coupler Dp emits light, which activates the phototransistor Tm. Then, the relay switch R4 is activated to close contacts r4-1 and r4-2. Closing the contact r4-1 causes the self-holding step of the relay switch R4, while closing the contact r4-2 causes the voltage of the battery 20 to be supplied to the data communication unit 21.

According to the circuit in FIG. 10, compared with the circuit in FIG. 8, a smaller output voltage from the accumulation circuit 16 activates the relay switch R4. While the circuit in FIG. 10 is in standby mode, leakage current flows through the relay switch R4 and the phototransistor Tm. However, a leakage current from the phototransistor is 100 pA or less, thus, the circuit in FIG. 10 can substantially reduce power consumption in standby mode to approximately zero.

What is claimed is:

1. An IC card for use with a radio data transmitter/receiver device that transmits a first signal comprising a predetermined pattern and a second radio signal comprising predetermined carrier-modulated data from a transmitting antenna, the IC card comprising:

a radio switching means, activated by the predetermined pattern in said first radio signal, comprising:
   a receiving antenna for receiving said first radio signal;
   a surface acoustic wave (SAW) matched filter for extracting said predetermined pattern from said received first radio signal;
   an accumulation circuit for generating an output power accumulated from said SAW matched filter; and
   a switching circuit, activated when said output power from said accumulation circuit exceeds a predetermined threshold value; and a data communication unit for receiving said second radio signal from and transmitting a third radio signal comprising data to said transmitter/receiver device, for processing said data, and for transmitting a control signal to said radio switching means after terminating transmission or reception and processing of said data;

wherein said data communications unit is connected to a battery via said switching circuit for supplying power to said data communication unit in response to activation of said radio switching means.

2. An IC card according to claim 1, wherein said SAW matched filter comprises an $Al_2O_3$ substrate, an AlN film formed on said $Al_2O_3$ substrate, and an Al tapping pattern formed on said AlN film.

3. An IC card for use with a radio data transmitter/receiver device that transmits a first signal comprising a predetermined pattern and a second radio signal, the IC card comprising:

a radio switching means, activated by the predetermined pattern in said first radio signal, comprising:
   a receiving antenna for receiving said first radio signal;
   a surface acoustic wave (SAW) matched filter for extracting said predetermined pattern from said received first radio signal;
   an accumulation circuit for generating an output power accumulated from said SAW matched filter; and
   a switching circuit, activated when said output power from said accumulation circuit exceeds a predetermined threshold value;

a data communication unit for receiving said second radio signal from and transmitting a third radio signal comprising data to said transmitter/receiver device, for processing said data, and for transmitting a control signal to said radio switching means after terminating transmission or reception and processing of said data;

wherein said data communications unit is connected to a battery via said switching circuit for supplying power to said data communication unit in response to activation of said radio switching means;

switch-activation means for transmitting said first radio signal, said switch-activation means comprising:
   noise code generating means for generating a pseudorandom noise code;
   means for generating said first radio signal by modulating a carrier using said noise code; and
   an antenna for radiating said first radio signal; and transmitter/receiver means for transmitting a second radio signal comprising data and for receiving a third radio signal comprising data from a data communications unit activated by said first radio signal.

4. A radio IC card system according to claim 3 wherein said SAW matched filter comprises an $Al_2O_3$ substrate, an AlN film formed on said $Al_2O_3$ substrate, and an Al tapping pattern formed on said AlN film.

* * * * *